United States Patent
Whitman, Jr.

(10) Patent No.: US 7,321,657 B2
(45) Date of Patent: Jan. 22, 2008

(54) DYNAMIC FORCE MANAGEMENT SYSTEM

(75) Inventor: Raymond Whitman, Jr., Grayson, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 598 days.

(21) Appl. No.: 10/740,873

(22) Filed: Dec. 19, 2003

(65) Prior Publication Data

US 2005/0160142 A1   Jul. 21, 2005

(51) Int. Cl.
  *H04M 3/00* (2006.01)
(52) U.S. Cl. .......................... 379/265.05; 379/265.02; 379/265.12
(58) Field of Classification Search ........... 379/265.05, 379/265.02, 265.12
  See application file for complete search history.

(56) References Cited

U.S. PATENT DOCUMENTS 5,185,780 A * 2/1993 Leggett ................. 379/265.08
5,963,635 A * 10/1999 Szlam et al. ................. 379/309
6,044,355 A * 3/2000 Crockett et al. ............... 705/8
6,775,378 B1 * 8/2004 Villena et al. ......... 379/266.07

* cited by examiner

*Primary Examiner*—Rasha S. Al-Aubaidi
(74) *Attorney, Agent, or Firm*—Thomas, Kayden, Horstemeyer & Risley

(57) ABSTRACT

Systems and methods for dynamic allocation of agents for a network, which in one embodiment among many, can be broadly summarized by a representative method of receiving network data for a given time interval, where the network data is related to calls between users of the network and agents having agent-profiles that worked during the first time interval; determining a desired number of agents to work during another time interval based at least in part on the profiles of the agents that worked in the network during the given time interval; and assigning a group of agents to work during the other time interval, where the number of agents in the group is equal to the desired number.

20 Claims, 6 Drawing Sheets

46 ⟶

| STATISTICAL ANALYSIS/ FORECAST MODULE | 48 |
|---|---|
| CALL STATISTICS DATABASE | 50 |
|     ACCUMULATED STATISTICS | 58 |
|     DAILY LOG | 60 |
| AGENT PROFILES | 52 |
| PREDICTABLE VARIABLES DATABASE | 54 |
| CALENDAR | 56 |

FIG. 3

| DAILY LOG | 60 |
|---|---|
| WORK FORCE | 5 |
| DATE | 08/21/2003 |
| DAILY CALL VOLUME | 35,294 |
| DAILY WORK VOLUME | 47,503 |
| DAILY AWT | 27.9 |
| DAILY ANS | 2.4 |
| DAILY OCC | 85 |

FIG. 4

| ACCUMULATED STATISTICS | 58 |
|---|---|
| WORK FORCE | 5 |
| CALL VOLUME | 35,214 |
| WORK VOLUME | 9,684 |
| AWT | 27.5 |
| ANS | 2.7 |
| OCC | 91 |

FIG. 5

| AGENT PROFILE | 52 |
|---|---|
| AGENT | 123456789 |
| WORK FORCE | 16 |
| OFFICE | 5 |
| LANGUAGE SKILLS | |
| ENGLISH | 1 |
| SPANISH | 1 |
| GERMAN | 0 |
| FRENCH | 0 |
| JAPANESE | 0 |
| CHINESE | 0 |
| WORK SKILLS | |
| DIRECTORY ASSISTANCE | 1 |
| BILLING | 1 |
| CUSTOMER SERVICE | 0 |
| TECHNICAL SERVICE | 0 |
| DA RATING | |
| AWT | 2.5 |
| ERROR RATE | 0.3 |
| TOUR COMPLIANCE | 90 |
| SWITCH TOUR COMPLIANCE | 94 |
| EXPERIENCE | 2.1 |
| BILLING RATING | |
| AWT | 5.5 |
| ERROR RATE | 1.5 |
| TOUR COMPLIANCE | 90 |
| SWITCH TOUR COMPLIANCE | 93 |
| EXPERIENCE | 5.1 |

FIG. 6

DYNAMIC FORCE MANAGEMENT SYSTEM

CROSS-REFERENCE TO RELATED APPLICATIONS

This application is one of seven related co-pending U.S. utility patent applications, which are all filed on the same day as the present application. The other six patent applications, which are each incorporated in their entireties by reference herein, are listed by attorney docket number and title as the following:

Ser. No. 10/740,874 "Generation of Automated Recommended Parameter Changes Based on Force Management System (FMS) Data Analysis";

Ser. No. 10/741,612 "Agent Scheduler Incorporating Agent Profiles";

Ser. No. 10/741,738 "Method and System for Predicting Network Usage in a Network Having Re-occurring Usage Variations";

Ser. No. 10/741,650 "Resource Assignment in a Distributed Environment";

Ser. No. 10/741,394 "Efficiency Report Generator"; and

Ser. No. 10/741,643 "Force Management Automatic Call Distribution and Resource Allocation Control System".

TECHNICAL FIELD

The present disclosure is generally related to management of workforces and, more particularly, is related to a system and method for managing agents in call centers.

BACKGROUND OF THE DISCLOSURE

A modern telephony system includes a switch that routes incoming calls to individuals, agents, usually located in a call center, or a remote office, and a control center that receives information from the switch. The control center includes a call-supervisor who is trained to review the information from the switch and trained to monitor the call traffic patterns to maintain a balance between call demand and the workforce. The call-supervisor is responsible for making certain that the workforce has a sufficient number of agents working at any given time to serve customer demand.

In a modern telephony system, the agents are frequently distributed in remote locations to handle subscriber services. Typically, the agents are assigned to specific workforces, where a given workforce handles specific types of calls such as directory assistance, or billing assistance, etc. Normally, the work schedules for the agents in a workforce are planned approximately one to several weeks in advance. What is sought is a method and a system for automatically providing workforce recommendations to the call-supervisor such that the call-supervisor can dynamically allocate agents that are scheduled to work the current day, responsive to customer demand for the current day, such that the workforce has a desired number of agents that should match customer demand.

SUMMARY OF THE DISCLOSURE

Embodiments, among others, of the present disclosure provide a system and method for dynamic allocation of agents.

Briefly described, in architecture, one embodiment of the system, among others, can be implemented as follows. A dynamic agent allocator system includes logic adapted to receive network data for a given time interval, determine a desired number of agents to work during another time interval based at least in part on agent-profiles for agents that worked in the network during the given time interval, and assign a group of agents to work during the other time interval, where the number of agents in the group is equal to the desired number.

One embodiment of the present disclosure can also be viewed as providing methods for dynamic allocation of agents. In this regard, one embodiment of such a method, among others, can be broadly summarized by the following steps: receiving network data for a given time interval, where the network data is related to calls between users of the network and agents that worked during the given time interval, where the agents have associated agent-profiles; determining a desired number of agents to work during another time interval based at least in part on the profiles of the agents that worked in the network during the given time interval; and assigning a group of agents to work during the other time interval, where the number of agents in the group is equal to the desired number.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a block diagram of a database.

FIG. 4 is a block diagram of a daily log of the telephony system.

FIG. 5 is a block diagram of accumulated statistics of the telephony system.

FIG. 6 is a block diagram of an agent-profile.

FIG. 9 is a block diagram of the projected agent line and an adjusted agent line.

FIG. 10 is a flow chart illustrating steps for creating an adjusted agent line.

DETAILED DESCRIPTION OF THE PREFERRED EMBODIMENT

The present disclosure is described in terms of managing resources in call centers for a telephone system. However, this description is for illustrative purposes only and is a non-limiting example of the present disclosure. The present disclosure can also be implemented in any organization, among others, having workforces that respond to variable workloads such as, but not limited to, a group of agents receiving calls through an automated call distribution process including private branch exchange (PBX) and switching configuration. Thus, the present disclosure is intended to cover any network.

Any process descriptions or blocks in flow charts should be understood as representing modules, segments, or portions of code which include one or more executable instructions for implementing specific logical functions or steps in the process, and alternate implementations are included within the scope of preferred embodiments in which functions may be executed out of order from that shown or discussed, including substantially concurrently or in reverse order, depending on the functionality involved, as would be understood by those reasonably skilled in the art of the present disclosure.

Figure 1:
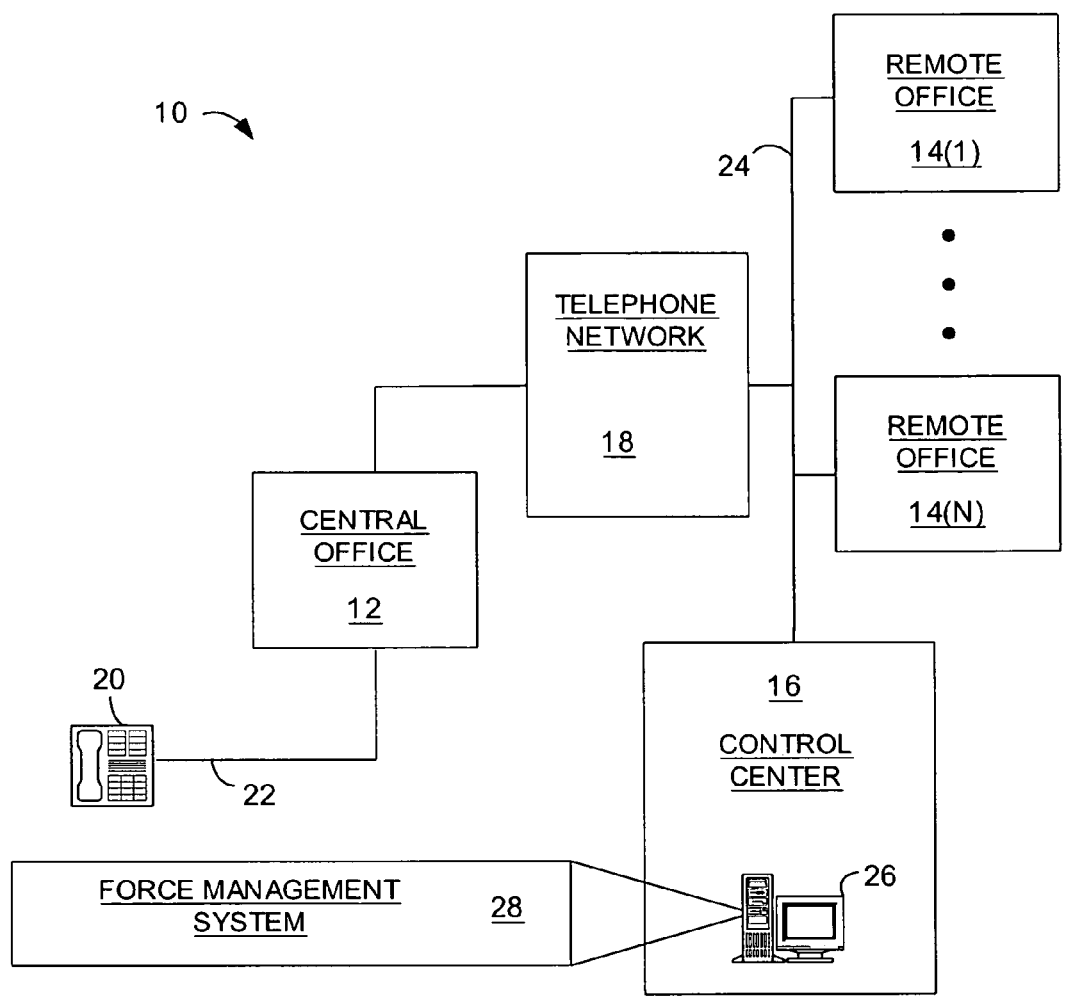
FIG. 1 is a block diagram of a telephony system.

Referring to FIG. 1, a telephone system 10 having a central office 12, a plurality of remote offices 14, and a control center 16, are all connected to a telephone network 18. A subscriber uses a telephone 20, which is connected to the central office 12 via a communication link 22, to access services of the telephone system.

The central office 12 includes a switch (not shown) that routes the subscriber's call to the telephone network 18, which includes general telephony circuitry such as central offices, trunks, end-offices, etc., known to those skilled in the art.

Typically, the remote offices are call centers from which agents make or receive calls, which handle, among other things, incoming subscriber service calls such as, but not limited to, "Directory Assistance Type" calls and "Billing Type Calls". Responsive to the subscriber's call being a service call, the central office 12 routes the call through the network to one of the remote offices 24, via a communication link 24, where an agent handles the call. The communication links 22 and 24 can be any communication link: wired, wireless, optical fibers, etc., known to those skilled in the art.

Typically, the telephone system 10 must meet performance requirements established by a regulatory body, and the control center 16 is responsible for, among other things, providing the necessary human resource, e.g., agents, to the remote offices 14 to meet the performance requirements. The control center 16 includes supervisory personnel, call-supervisors, (not shown) and a computer system 26 having a force management system (FMS) 28 included therein. Generally, a computer network 44 (see FIG. 2) connects the central office 12, remote centers 14, and the control center 16 such that the FMS 28 and other computer services are available to authorized personnel at any of the locations.

In one embodiment, among others, schedulers employ the FMS 28 to generate, among other things, agent lines, which are explained in detail hereinbelow, and tours (work shifts) for agents. The schedulers may be remotely located but are usually located in the control center 16.

Figure 2:
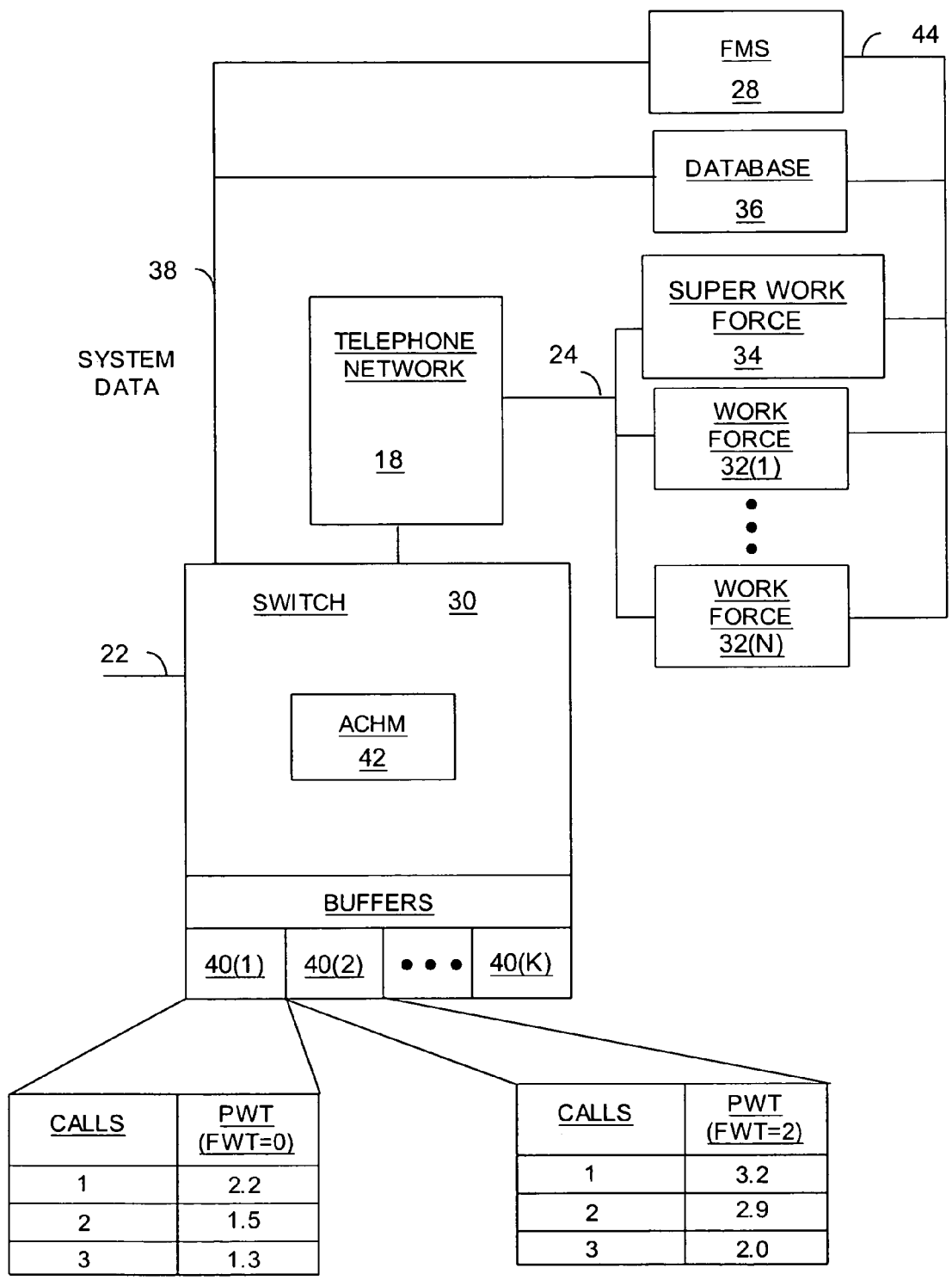
FIG. 2 is a block diagram of a portion of a telephony system.

Referring to FIG. 2, the central office 12 includes a switch 30, which receives telephone calls from subscribers via communication link 22 and, among other things, routes the calls to workforces 32 and super workforce 34. For the purposes of this disclosure, a workforce is comprised of a set of agents assigned to handle a specific type of call. Typically, associated information facilitates the agent in handling the call efficiently. For example, workforce 32(1) is a directory assistance (DA) workforce; and workforce 32(2) (not shown) is a billing workforce of the telephone system 10. Other workforces include workforces that call out instead of receiving incoming calls, an example of which is a telemarketing workforce. Each workforce 32 may be distributed throughout multiple remote offices 14.

A super workforce 34 is comprised of agents assigned to handle multiple types of calls. For example, agents of the super workforce 34 might be assigned to handle both directory assistance calls and other types of incoming calls for subscribers speaking a language other than English. The super workforce 34 may also be distributed through multiple remote offices 14. For the purposes of this disclosure, a super-workforce shall be treated as if it were a "workforce."

In one preferred embodiment, the switch 30 is an automated computerized system such as, but not limited to, Northern Telecom DMS 200, Northern Telecom Meridian, Rockwell ISS-3000, and Lucent 5E into which agents log in. To log-in, each agent provides a user-name and a password, which in some embodiments may be optional. The switch 30 is in communication with a database 36 via a communication link 38. The database 36 includes agent-profiles 54 (see FIG. 6), and each agent-profile 54 provides, among other things, information regarding the training and efficiency of the agent. When an agent logs onto the switch 30, the switch 30 uses the agent-profile 54 for that agent to determine, among other things, the agent's workforce. The switch 30 also determines, during the log-in procedure, from which console/terminal (not shown) the agent is working. When an agent is logged into the switch 30, the switch 30 monitors call traffic to the agent and whether the agent is logged into the switch 30 and provides this system information, among other information to the database 36. Generally, the agent logs out of the switch 30 for breaks and training so that the switch 30 knows that the agent is not available to handle calls. The log-out times are also included in the system data.

Among other things, for certain types of calls the switch 30 attempts to handle incoming calls automatically. If the switch 30 cannot handle the incoming calls automatically, the switch 30 routes the incoming calls to an agent in an appropriate workforce 32. The switch 30 includes a plurality of buffers 40 and an automated call-handling module (ACHM) 42. The ACHM 42 includes in some embodiments, tone and voice recognition logic for interfacing with subscribers and, if possible, providing the necessary services. For example, when the ACHM 42 receives a "Directory Assistance Type" call, the ACHM 42 delivers a series of questions to the caller such as: "what state?", "what city?", "what listing?". The ACHM 42 checks the database 36, and attempts to determine the requested information. The database 36 includes subscriber information such as name and telephone numbers of subscribers, addresses, etc. If the ACHM 42 cannot totally handle the incoming call, the call is placed in the appropriate buffer 40. In one preferred embodiment, the switch 30 associates information in the database 36 with information provided by the caller. When the call is taken out of the buffer 40 and provided to an agent, the switch 30 then provides the associated information to the agent via the computer network 44. Typically, associated information facilitates the agent in handling the call efficiently. For example, in one embodiment, the associated information includes information collected from the customer by the ACHM 42, i.e. city and listing, and typically, the associated information is then played to the agent without some of the initial silence before, between and after the customer verbal input.

Each one of the buffers 40 is associated with one of the workforces 32, and typically, multiple buffers, sometimes referred to as queues, are associated with a single workforce. For example, the buffers 40(1)-40(3) are associated with the directory assistance workforce 32(1). Thus, when the switch 30 receives an incoming directory assistance call that the ACHM 32 cannot handle, the switch 30 places the incoming call into one of the buffers 40(1)-40(3). Typically, the directory assistance agents handle these calls based upon geographic regions because the directory assistance agents can normally handle calls faster for regions with which they are familiar. So, in one embodiment, the buffers 40(1)-40(3) are associated with different geographic regions, so that all of the "Directory Assistance Type" calls from a particular region are sent into the same buffer, and directory assistance agents who are familiar with that region handle those calls.

In addition, the buffers for a workforce 32 can be prioritized. In one embodiment, high priority calls are put into one buffer and lower priority calls are placed in a different buffer. Typically, switch 30 handles the calls for a workforce 32 on a quasi first-in-first-out basis. For example, in one embodiment, the higher priority calls are prioritized by adding a "fictitious wait time" (FWT) to them, and then the switch 30 takes calls out of the buffer based upon a "pseudo-wait time" (PWT), which is the sum of the FWT and the real wait time (RWT), where RWT is the actual amount of time that the call has been in the buffer. For example, the FWT for buffer 40(1) is zero seconds, and the FWT for buffer 40(2) is two seconds. Thus, the RWT and PWT for calls in buffer 40(1) are the same, whereas, the PWT is two seconds ahead of the RWT for calls in buffer 40(2). The PWT for call 1 in buffer 40(2) is 3.2 seconds while its RWT is only 1.2 seconds. Based upon the PWT for calls in buffers 40(1) and 40(2), the switch 30 will take calls "1" and "2" from buffer 40(2) before taking call "1" from buffer 40(1).

The switch 30 provides system data to the force management system 28 and database 36. Various switch configurations typically use either scans or time stamps to determine how long calls wait for service. For this discussion, switch 30 receives counts and directs calls to the buffers and scans the buffers 40 every 10 seconds or so and determines how long each call has been in one of the buffers, i.e., the RWT for each of the calls. The switch 30 may then determine an average RWT for the calls in each buffer and provide an instantaneous buffer count and average RWT for each buffer, or the switch 30 may average the results from several scans together. However, for a given time span, the system data includes, but is not limited to, the number of calls received by the switch over the given time-span, the number of calls handled by the ACHM 38 over the given time-span, the average number of calls in each buffer 40 over the given time-span, and the average RWT for calls in each buffer over the given time-span. Typically, the system data is reported from the switch to the FMS 28 and database 36 approximately every 10 seconds or so. However, in alternative embodiments, the switch 30 may report system data more frequently or less frequently.

The switch also monitors agents in the workforces 32 and the super workforce 34. Before discussing the system data that is related to the agents in more detail, it is helpful to define some terms. For the purposes of this disclosure, a "tour" is defined as the time-spans that an agent is scheduled to work, and a "switch-tour" is defined as the time-spans that an agent is scheduled to be logged into the switch 30. On any given day, an agent's tour and switch-tour can differ due to scheduled training or other reasons. "Compliance" is defined as the percentage of an agent's switch-tour that the agent is logged into the switch. "Personal-occupancy" is defined as the percentage of an agent's switch-tour that the agent spends handling calls. The system data reported by the switch 30 includes personal-occupancy and compliance for each of the agents logged into the switch 30. The system data also includes personal average work time (AWT) for each of the agents, where average work time is the average amount of time that an agent spends handling a call. Because the switch 30 monitors, among other things, who is logged-in, when they logged-in and logged-out, how many calls the agents received, how long the calls lasted, etc., the system data reported by the switch 30 can include other quantities not described hereinabove. The average-work-time, occupancy, compliance, etc. can be calculated by the FMS 28 on a per-agent (personal) basis and/or calculated for the entire workforce.

Referring to FIG. 3, the FMS 28 includes a memory 46 having a statistical analysis/forecasting module 48, a call-statistics database 50, and agent-profiles 52. The call statistics database 50 includes accumulated statistics 54 and daily logs 56. The accumulated statistics 54 and daily logs 56 are broken down into workforces 32. Among other things, the statistical analysis/forecasting module 48 processes data in the call-statistics database 50 to generate, among other things, the accumulated statistics.

FIG. 4 illustrates one exemplary daily log 56 for workforce 32(5), and FIG. 5 illustrates exemplary accumulated statistics 54 for workforce 32(5). The quantities calculated and tabulated in the daily log 56 and the accumulated statistics 54 are generated by the switch 30 and FMS 28.

Referring to FIG. 4, exemplary daily log 56 includes the date of the log and quantities such as, but not limited to, daily call volume, daily work volume, daily average work time (AWT), daily average time-to-answer (ATA) and daily occupancy (OCC). The daily call volume is simply the number of calls received by workforce 32(5) during the day associated with the daily log, which in this example is Aug. 21, 2003.

The daily AWT is the average amount of time that an agent in workforce 32(5) spends working a call on that day. The daily ATA is the average amount of time a call spends in a buffer on that day. The daily occupancy (OCC) is a measure of the amount of time that the agents in workforce 32(5) work incoming calls on that day. The daily OCC is the average of the personal-occupancy for the agents in the workforce on that day.

The daily work volume is the amount of time in CCS (Centum Call Seconds) or XCS, a measurement of time where 1 XCS equals 10 seconds where the product of the daily call volume and AWT divided by 100. Generally, the different workforces handle calls of different complexity, and the time to handle a call is generally proportional to the complexity of the call. For example, calls to the billing workforce will require more time to handle than calls to the directory assistance workforce, and therefore, the AWT for the billing workforce is greater than the AWT for the directory assistance workforce. The work volume provides a way to compare the workforces 32 regardless of the type of calls that the different workforces handle.

Typically, the daily log 56 is kept in the statistical database 50 for a predetermined period of time such as six (6) months. The daily logs 56 are used for, among other things, spotting trends, scheduling agents, and refining workforce lines, as will be explained hereinbelow. In one embodiment, the daily log might be broken down into segments of time such as, but not limited to, morning, afternoon, evening, and night, and the statistics for each segment of time are then calculated.

Referring to FIG. 5, the accumulated statistics 54 include, among other things, averages of daily statistics. Thus, in one embodiment, the accumulated statistics 54 are averages of statistics that are found in the daily log that have been accumulated over a period of years. Typically, the accumulated statistics are based upon what is known as an average business day (ABD). Thus, Saturdays and Sundays, and holidays, are not included in the accumulated ABD statistics 54. However, call statistics are also accumulated for non-ABD days such as Saturdays and Sundays, and those accumulated call statistics are used in projecting call volume. Typically, accumulated statistics 54 are used by the force management system 28 for, among other things, scheduling agents for a workforce 32 and/or super workforce.

The accumulated statistics can be averaged over a long period of time such as the entire time span over which the telephone system 10 has records of daily logs or shorter time-spans such as the last six years, or last six months, etc. One advantage of averaging over a long period is that the daily fluctuations are "washed" out of the average, but a disadvantage is that trends may also be lost. For example, assume that the ABD work volume for eight of the last ten years had remained at an approximate constant (X), in year nine the ABD work volume was 1.125X and in year ten it was 1.5X. In that case, the average ABD work volume of the last ten years is then 1.0625X, which obscures the rate of growth over the last two years.

In one preferred embodiment, the statistical analysis/forecasting module 48 fits the work volume data to a predetermined parameterized function, and then uses the parameterized function to extrapolate work volumes for a subsequent week. Those skilled in the art are familiar with algorithms, such as, but not limited to, least-square-fit for fitting data and all such algorithms are intended to be within the scope of the disclosure. Furthermore, as those skilled in the art will recognize, by fitting the data to a parametric function, derivatives including first order and higher order derivatives of the function can be taken to help extrapolate the data. In one embodiment, the statistical analysis/forecasting module 48 also includes logic to apply probabilistic algorithms such as, but not limited to, Erlang C to, among other things, forecast work volume and operator lines, which will be explained in detail hereinbelow.

An exemplary agent-profile 52 is illustrated in FIG. 6 and the agent-profile includes, an agent identifier 58, a workforce identifier 60, an office identifier 62, language skills identifiers 64, and work skills identifier 66. The agent associated with the exemplary agent-profile 52 currently works in remote office 5 in workforce 32(16). The agent associated with the exemplary agent-profile 52(A) is bilingual (English and Spanish) and has been trained in both directory assistance and billing. The agent-profile 52 includes skill ratings for each area that the agent has been trained, such as a directory assistance rating 68 and a billing rating 70. Each rating includes, among other things, statistics related to the agent's efficiency. The agent has an average work time (AWT) of 2.5 seconds for directory assistance and 5.5 seconds for billing. The skill ratings 68 and 70 also include the agent's error rate, tour compliance, switch-tour compliance, and years of experience. Switch-tour compliance is defined as the percentage of time that the agent is "logged into" the switch 30 per the workable amount of time per tour. Tour compliance is the probability that the agent will actually report to work for a tour that they are scheduled to work. Other quantities can also be included in the agent-profile 52. In an alternative embodiment, quantities can be broken down into time segments. For example, AWT can be broken down into the first half of a tour, and a second half of a tour, or for every fifteen minutes, or other time intervals. In one embodiment, the agent-profile for a new agent, or an agent who is new to a workforce, is given an agent-profile that has default values, among other things, for the skill ratings. After the agent has been trained and in the position for a set period of time, the default values are replaced by calculated values related to the agent's record.

Figure 7:
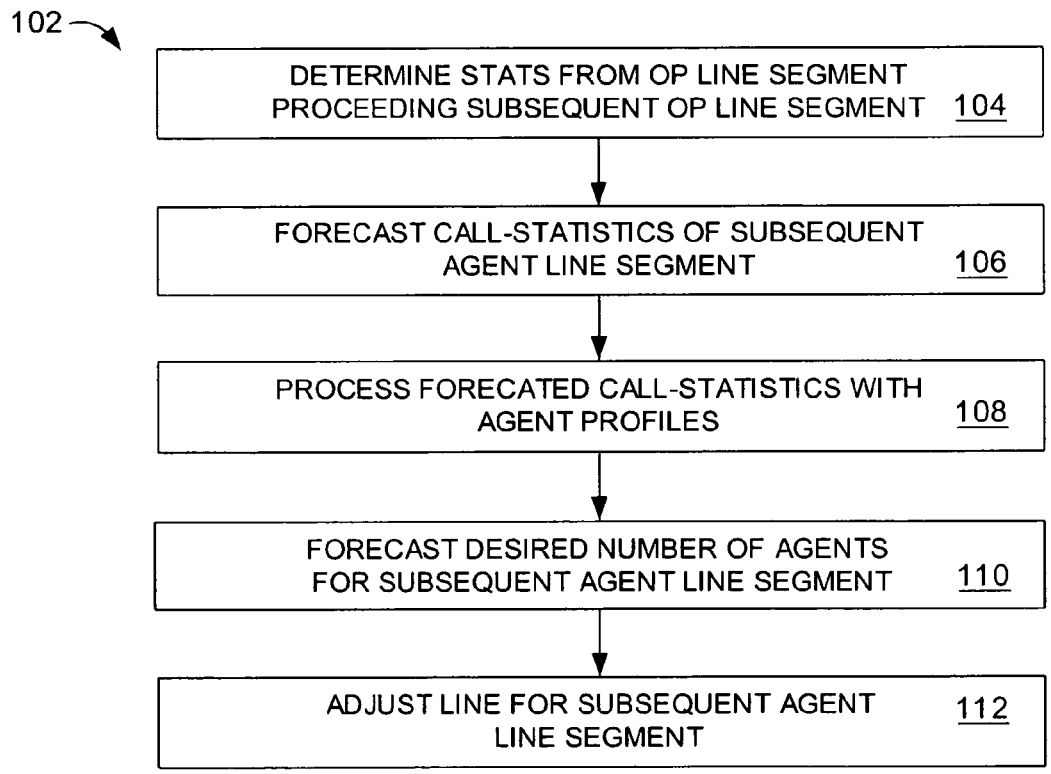
FIG. 7 is a block diagram of a projected agent line.

Referring to FIG. 7, among other things, the FMS 28 generates an agent line 72 for a workforce 32. The agent line 72 shows the number of agents in a workforce that are projected to be needed for every fifteen minutes of an upcoming day. For the purposes of this disclosure, each fifteen-minute time span of the agent line 72 is an agent line segment 74. For a directory assistance workforce, the agent line 72 covers a 24-hour day, whereas the agent line for a billing assistance workforce may only cover ten hours of a day such as from 8:00 a.m. through 6:00 p.m. The agent line 72 is established by the FMS 28 using, among other things, historical information stored in the database 36.

Figure 8:
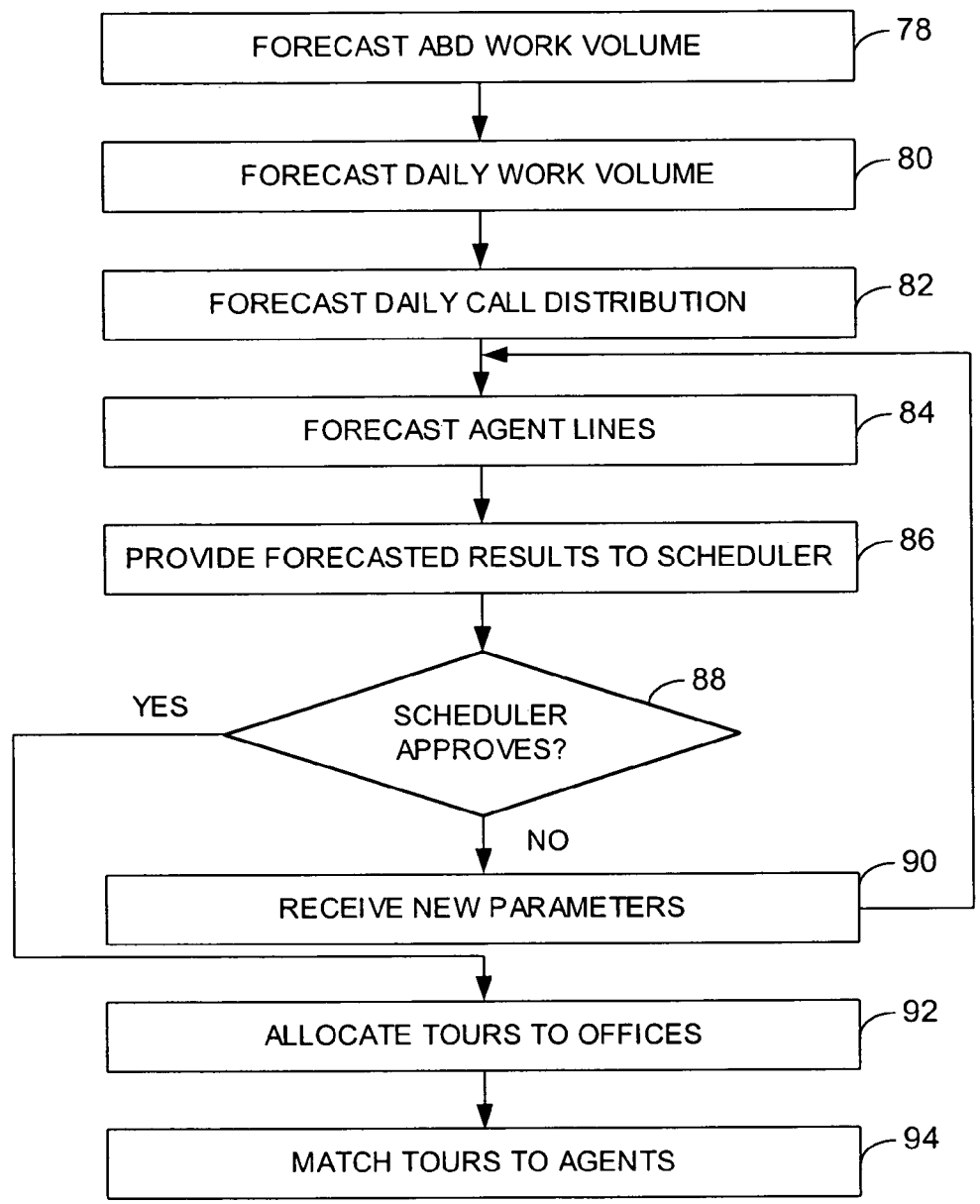
FIG. 8 is a flow chart illustrating steps for creating a projected agent line.

Referring to FIG. 8, the steps 76 shown in FIG. 8 include exemplary steps taken by the FMS 28 to generate the agent line 72 for a day in an upcoming week. Typically, the upcoming week is approximately two weeks in the future. The projected agent line 72 is forecasted approximately two weeks in advance so that the agents in the workforce having the projected agent line can be properly scheduled.

In step 78 the FMS 28 forecasts the ABD work volume for the upcoming week. The forecasted ABD work volume is based upon historical information and the database 36 such as the historical ABD work volume. Other factors may include, but are not limited to, historical trends in the ABD work volume. For example the statistical analysis/forecasting module can fit the work volume data to a parameterized function and then uses the parameterized function to forecast the work volume for the upcoming week. In one embodiment, a predetermined number of terms from a Taylor series expansion of the parameterized function is used to extrapolate the ABD work volume for the upcoming week.

In step 80, the daily work volume for each day of the week for the upcoming week is forecasted. Generally, the daily work volume follows historical trends. For example, the daily work volume on a Sunday is 75% of the work volume for an ABD. Table 1 shows a historical daily work volume per ABD work volume for an exemplary call center.

TABLE 1

| | Day | | | | | | |
|---|---|---|---|---|---|---|---|
| | Sun. | Mon. | Tues. | Wed. | Thurs. | Fri. | Sat. |
| Work Volume/ ABD | 0.75 | 1.01 | 1.02 | 0.99 | 0.97 | 1.01 | 0.90 |

In step 82, the FMS 28 generates a forecasted daily call distribution for every fifteen minutes for each day of the upcoming week. Each forecasted daily call distribution is based at least in part upon historical information and database 36. Specifically, the database includes historical call distributions for each day of the week.

In step 84, the FMS 28 uses adjustable parameters such as desired agent occupancy and desired AWT to generate forecasted agent lines for each day of the upcoming week based upon the forecasted call statistics. In one embodiment, the FMS 28 employs the statistical analysis/forecasting module 48 to apply algorithms such as Erlang C to calculate probabilities to determine agent requirements to meet a desired standard such as, but not limited to, average-time-to-answer to forecast the operator line. In step 86, the FMS 28 provides the forecasted results to a scheduler.

In step 88, the scheduler approves or disapproves the forecasted agent lines. If the scheduler disapproves, then in step 90, the scheduler provides new adjustable parameters to the FMS 28, and then the FMS 28 returns to step 84. On the other hand, if the scheduler approves, then in step 92, the FMS 28 allocates shifts to the offices. For example, based upon an agent line, the FMS 28 determines that five agents need to start their shifts at 6:00 a.m., nine agents need to start their shifts at 7:00 a.m., and three agents need to start at 7:30 a.m. The FMS 28 then determines the number of shifts at each starting time that should be allocated to the offices based at least in part upon the following criteria: the physical capabilities of each office and the number of agents available in each office. Offices having larger physical capabilities (more terminals/consoles) and a large number of agents will receive more shifts than smaller offices.

In step 94, the FMS 28 matches the allocated shifts to individual agents. Generally the matching of shifts to agents is done at least upon seniority or other work place rules and agent preference.

In the preferred embodiment, the call-supervisors in the control center 16 use the FMS 28 to adjust the forecasted agent line 72. Sometimes the actual work volume for a workforce falls outside of a tolerance for the forecasted work volume for that workforce, and when that occurs, the call supervisor of that workforce will adjust the agent line by adding or subtracting agents.

FIG. 9 illustrates a portion of a projected agent line 98 and a portion of an adjusted agent line 100 for a specific workforce 32 such as a directory workforce. The projected agent line 98 illustrates the number of agents scheduled to work during the agent line segments of the current day, and the adjusted agent line 100 illustrates the actual number of agents that have worked and are currently working the current day up to and including the current time, which is between 12:00 and 12:15. The projected agent line 98 was generated by the FMS 28 approximately two weeks ago. Whereas, the adjusted agent line 100 is generated by the FMS 28 responsive to, among other things, the work volume to the specific workforce. In one embodiment, the adjusted agent line 100 is generated by call-supervisors in response to recommendations by the FMS 28.

The projected agent line 98 and the adjusted agent line 100 differ in that at 11:45 a.m. and 12:00 p.m. the number of agents in the adjusted agent line is greater than the number of agents in the projected agent line. The agent line segment 74 starting at 12:15 p.m. has not yet been adjusted. If no adjustment is made, the projected agent line is the default. So if the FMS 28 and/or call-supervisors determine that no adjustment is necessary, then the thirty agents scheduled to work the 12:15 p.m. agent line segment 74 will work that agent line segment.

Typically, if one or more agents are added to the adjusted agent line 100, this is accomplished by re-scheduling breaks, or training sessions, or quitting times, etc. of one or more agents that are currently logged into the switch 30. For example, an agent who is currently logged into the switch 30 may be scheduled to take lunch at 12:00 p.m., but in response to the new adjusted agent line 100, that agent may have the start of their lunch time rescheduled to 12:30 p.m. Alternatively, agents who are working in another workforce might be temporarily re-assigned to the workforce that needs additional agents. Generally, agents are re-assigned from workforces that make outgoing calls. If on the other hand, one or more agents are removed form the adjusted agent line 100, this is also accomplished by advancing scheduled breaks, or training sessions, or quitting times, etc. and/or temporarily re-assigning agents to other workforces.

Referring to FIG. 10, steps 102 illustrate exemplary steps taken by the FMS 28 to generate the adjusted agent line 100. In step 104, the FMS 28 determines call statistics such as work volume, average time-to-answer, and/or average wait time for recent agent line segments including the current agent line segment, which in the case illustrated in FIG. 9 is the agent line segment starting at 12:00 p.m. In one embodiment, the FMS 28 determines call statistics for only the current agent line segment 74, and in another embodiment, the FMS 28 determines call statistics for at least one previous agent line segment such as the agent line segment that precedes the current agent line segment.

In step 106, the FMS 28 forecasts the call statistics for the subsequent agent line segment, which for the situation illustrated in FIG. 9 starts at 12:15 p.m. In step 108, the FMS 28 processes the forecasted call statistics with agent-profiles for the agents that are already projected to work the subsequent agent line segment.

In step 110, the FMS 28 uses the agent-profiles of the projected agents along with the forecasted call statistics to determine the "desired" number of agents for the subsequent agent line segment. Based at least upon the forecasted call statistics, the FMS 28 can determine that the number of projected agents will be sufficient to handle the calls for the subsequent agent line segment. Alternatively, the FMS 28 can also determine that the projected agents will not be sufficient (or overly sufficient) to handle the calls for the subsequent agent line segment. It should be remembered that the number of forecasted agents calculated in step 110 is not merely a function of the forecasted call statistics which were calculated in 108. The number of forecasted agents is also a function of the agent-profiles of the projected agents. The FMS 28 determines which agents are currently logged into the switch 30 and which agents will be logged into the switch 30 at the start of the subsequent agent line segment. The switch 30 then uses the agent-profiles to calculate whether adjustments to the agent lines are necessary. For example, consider the situation where the forecasted call statistics project an increase in work volume for the subsequent agent line segment, but at least one of the currently working agents is scheduled to log out of the switch 30 at the end of the current agent line segment, and at least one new agent will log into the switch 30. Thus, even though the work volume is forecasted to increase in the subsequent agent line segment, the FMS 28 may decide that no adjustments to the agent line are required based upon the agent-profiles of those currently working and the agent-profiles of those scheduled to work the subsequent agent line segment. Similarly, the FMS 28 may decide to increase or decrease the number of agents based at least in part upon the agent-profiles of those currently working and the agent-profiles of those scheduled to work the subsequent agent line segment.

In one embodiment, the FMS 28 determines the desired number of agents using quantities such as each agent's AWT rating. For example, the FMS 28 determines for the subsequent agent line segment 74 the projected work volume and call volume using the forecasted call statistics. The FMS 28 then determines the number of calls that each of the agents who are currently scheduled to work in the subsequent agent line segment 74 can handle. The number of calls that an agent can handle over the subsequent agent line segment is the product of the duration of the agent line segment times the personal-occupancy of the agent divided by agent's AWT rating. For example, if an agent had a personal-occupancy of 90% and an AWT rating of 24, i.e., can handle one call per 24 seconds, then in 15 minutes (900 seconds) the agent can handle (900(seconds)*0.90/24(seconds/call)) 33.75 calls. In another example, the FMS 28 employs probabilistic methods such as, but not limited language, Erlang C to determine the projected number of calls to be serviced by an agent. The FMS 28 determines the adjusted agent line by putting agents into the adjusted agent line and summing the number of calls that each of the agents in the adjusted agent line can handle and comparing the summed number of calls with the projected number of calls. When the sum of the number of calls that the agents in the adjusted agent line can handle equals or exceeds the number of projected calls, then the adjusted agent line is set.

In step 112, the FMS 28 adjusts the agent line based upon the desired number of agents calculated in step 110, which may be the same or different from the number of agents determined approximately two weeks ago. In one embodiment, the FMS 28 provides the forecasted desired number of agents to the call-supervisors in the control center 16 and the call-supervisors then make the ultimate decision regarding whether to add or subtract agents from the subsequent agent line segment. The FMS 28, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A method for dynamic allocation of agents working in a network, the method comprising:
   receiving network data for a first time interval, the network data including data related to calls between users of the network and a workforce comprising agents having agent-profiles associated therewith, wherein the workforce includes a first group of agents that worked during the first time interval;
   determining in a second time interval a desired number of agents to work during a third time interval based at least in part on the profiles of the first group of agents, the determining including fitting the network data to a predetermined parameterized function using a least square fit that minimizes the square error and taking a derivative of the predetermined parameterized function; and
   assigning agents from the workforce to a second group of agents that work in the network during the third time interval, wherein the number of agents in the second group of agents equals the desired number of agents.

2. The method of claim 1, wherein determining in a second time interval a desired number of agents to work during a third time interval further includes:
   forecasting network data in the third time interval based at least in part on the network data of the first time interval.

3. The method of claim 2, wherein determining in a second time interval a desired number of agents to work during a third time interval further includes:
   determining which agents of the workforce are currently scheduled to work during the third time interval, wherein the scheduled agents define a third group of agents;
   processing the forecasted network data with the agent-profiles of the currently scheduled agents to forecast workforce statistics in the third time interval;
   selecting one of the group consisting of: (a) including at least one more agent in the third group, (b) removing at least one agent from the third group of agents, and (c) determining that the third group of agents is the desired number of agents; and
   defining the third group of agents as the second group of agents.

4. The method of claim 2, wherein the desired number of agents is based at least in part on a forecasted workforce statistic.

5. The method of claim 2, wherein the forecasted workforce statistic includes the projected average work time, wherein the projected average work time is defined as the average amount of time for one assigned agent to handle one call.

6. The method of claim 1, wherein the first, second and third time intervals are consecutive.

7. The method of claim 1, wherein the first, second and third time intervals are each less than or equal to twenty-four hours in duration.

8. The method of claim 7, wherein the third time interval follows the first time interval by no more than one day.

9. The method of claim 1, wherein the first, second and third time intervals are each less than one hour in duration.

10. The method of claim 1, wherein assigning agents includes extrapolating work volumes for the third time interval using the predetermined parameterized function.

11. A dynamic agent allocator system in a network, the system comprising:

logic configured to receive network data for a first time interval, the network data including data related to calls between users of the network and a workforce comprising agents having agent-profiles associated therewith, wherein the workforce includes a first group of agents that worked during the first time interval;

logic configured to determine in a second time interval a desired number of agents to work during a third time interval based at least in part on the profiles of the first group of agents including logic configured to fit the network data to a predetermined parameterized function using a least square fit that minimizes the square error and to take a derivative of the predetermined parameterized function; and logic configured to assign agents from the workforce to a second group of agents that work in the network during the third time interval, wherein the number of agents in the second group of agents equals the desired number of agents.

12. The system of claim 11, further comprising logic configured to forecast network data in the third time interval based at least in part on the network data of the first time interval.

13. The system of claim 12, wherein the determination logic further includes:

logic configured to determine which agents of the workforce are currently scheduled to work during the third time interval, wherein the scheduled agents define a third group of agents;

logic configured to forecast workforce statistics in the third time interval using the forecasted network data and the agent-profiles of the currently scheduled agents and logic configured to select one of the group consisting of:
(a) including at least one more agent in the third group,
(b) removing at least one agent from the third group of agents, and (c) determining that the third group of agents is the desired number of agents.

14. The system of claim 12, wherein the desired number of agents is based at least in part on a forecasted workforce statistic.

15. The system of claim 12, wherein the forecasted workforce statistic includes the projected average work time, wherein the projected average work time is defined as the average amount of time for one assigned agent to handle one call.

16. The system of claim 11, wherein the first, second and third time intervals are consecutive.

17. The system of claim 11, wherein the first, second and third time intervals are each less than or equal to twenty-four hours in duration.

18. The system of claim 17, wherein the third time interval follows the first time interval by no more than one day.

19. The system of claim 11, wherein the first, second and third time intervals are each less than one hour in duration.

20. The system of claim 11, wherein the network includes a switch adapted to receive telephone calls, and the switch communicates the network data to the dynamic agent system.

* * * * *